Patented Dec. 9, 1952

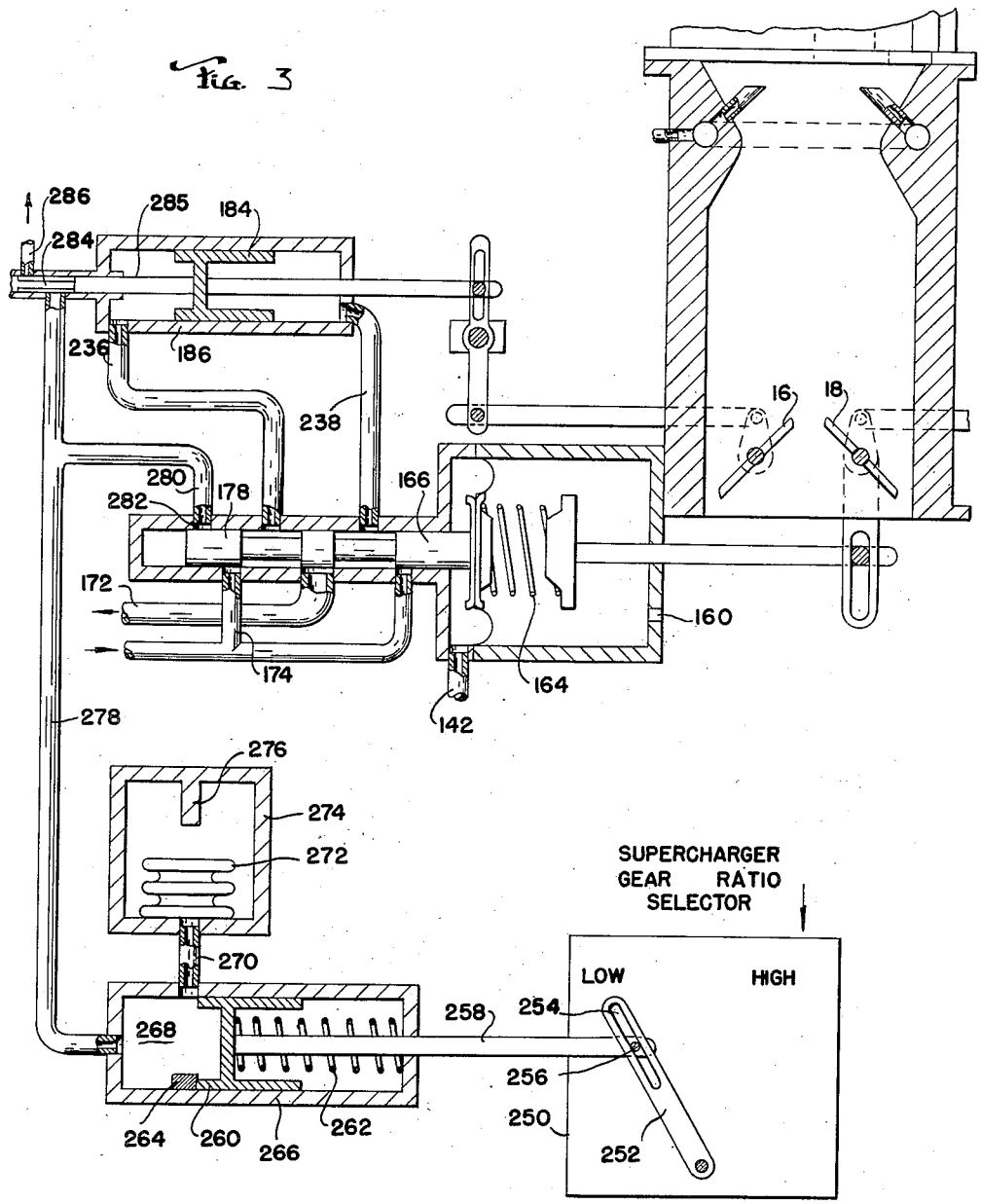

2,620,783

UNITED STATES PATENT OFFICE 2,620,783

CONTROL APPARATUS FOR INTERNAL-COMBUSTION ENGINES

Leighton Lee, II, Rocky Hill, Conn., assignor, by mesne assignments, to Niles-Bement-Pond Company, West Hartford, Conn., a corporation of New Jersey Application March 16, 1946, Serial No. 654,978

17 Claims. (Cl. 123—103)

The present invention relates to control apparatus for internal combustion engines, and particularly to apparatus for controlling the flow of combustion air to such engines.

Internal combustion engines are commonly controlled by throttling the supply of incoming combustion air. The throttle mechanism is customarily operated by a manual control. It has also been proposed to provide automatic controls for the throttles which would maintain a constant rate of air flow, which rate may be manually selected. Such automatic systems have the disadvantage that they generally lag somewhat behind a change in the selected rate of air flow. Also, some means must be provided for operating the throttle manually in case of failure of the automatic system. Such an arrangement results in complication of the throttle control. A manually controlled throttle does not have those disadvantages, but it does have the disadvantage that the rate of air flow may vary from any of several different causes, such as varying engine speed, quite independently of the throttle position.

It is an object of the present invention to provide an improved system for controlling the throttle of an internal combustion engine.

It is a further object to provide such a system which includes the advantages of the manually and automatically controlled systems without the disadvantages of either.

In particular, one object is to provide an automatic throttle control system which is very sensitive to movements of its manual controller, but which will not hunt.

Another object of the present invention is to provide an air flow control system for an internal combustion engine which includes two separately movable throttle blades, manual means for operating one blade, automatic means for operating the other blade in response to the rate of air flow, and means depending upon the position of the manual blade to control the rate of air flow to be maintained by positioning of the automatically operated blade.

A further object of the present invention is to provide an improved means for coordinating the throttle of an internal combustion engine with a device for regulating the speed of a supercharger supplying compressed air to the engine.

A further object is to provide such improved coordinating means for controlling a turbine driven supercharger.

A further object is to provide such improved coordinating means for controlling a supercharger which is directly driven by the engine.

Figure 1:
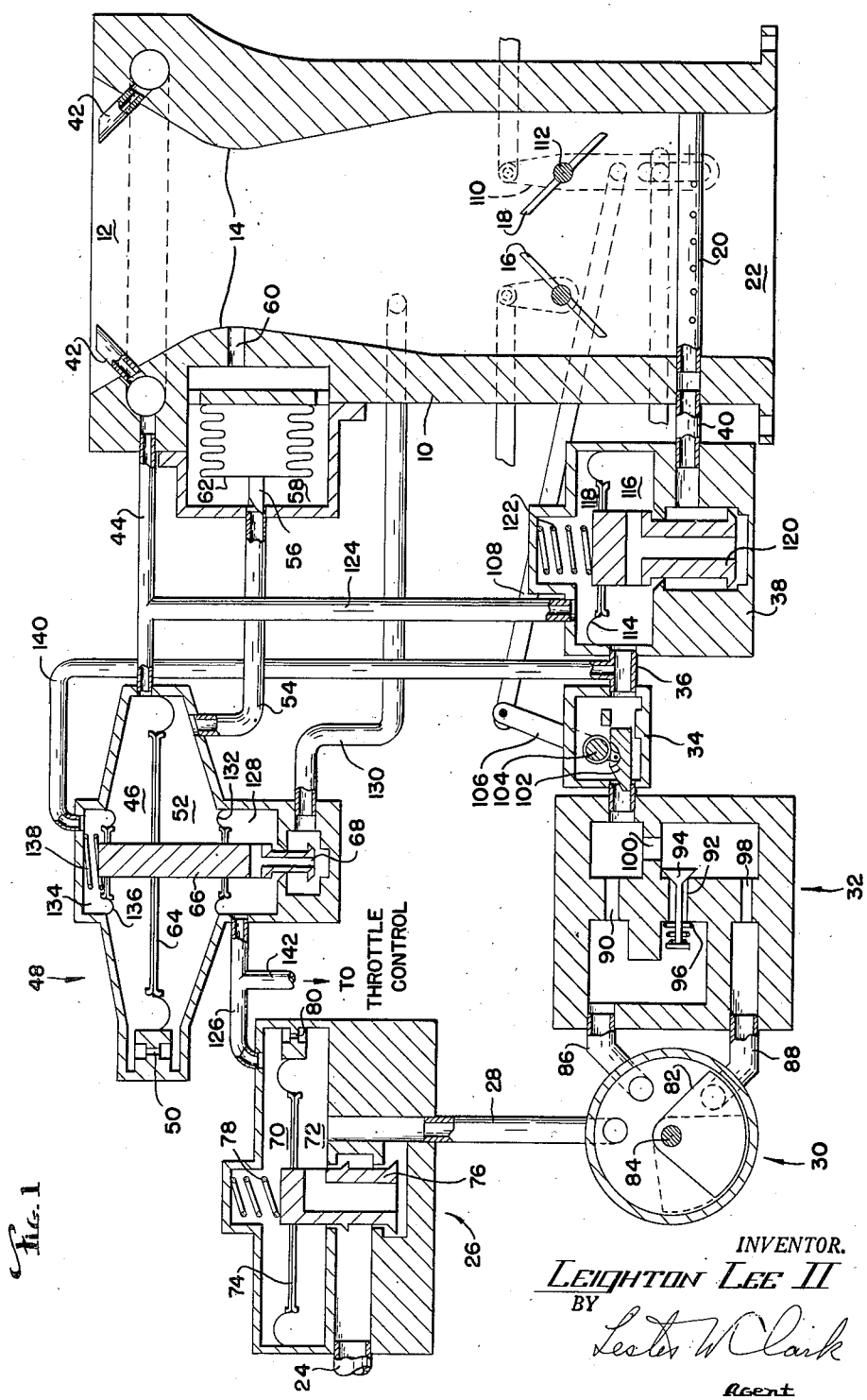

Other objects and advantages of my invention will become apparent from a consideration of the appended specification, claims and drawings, in which Figure 1 illustrates, somewhat diagrammatically, a carburetor for an internal combustion engine, including a throttle structure to which my invention may be applied.

Figure 2:
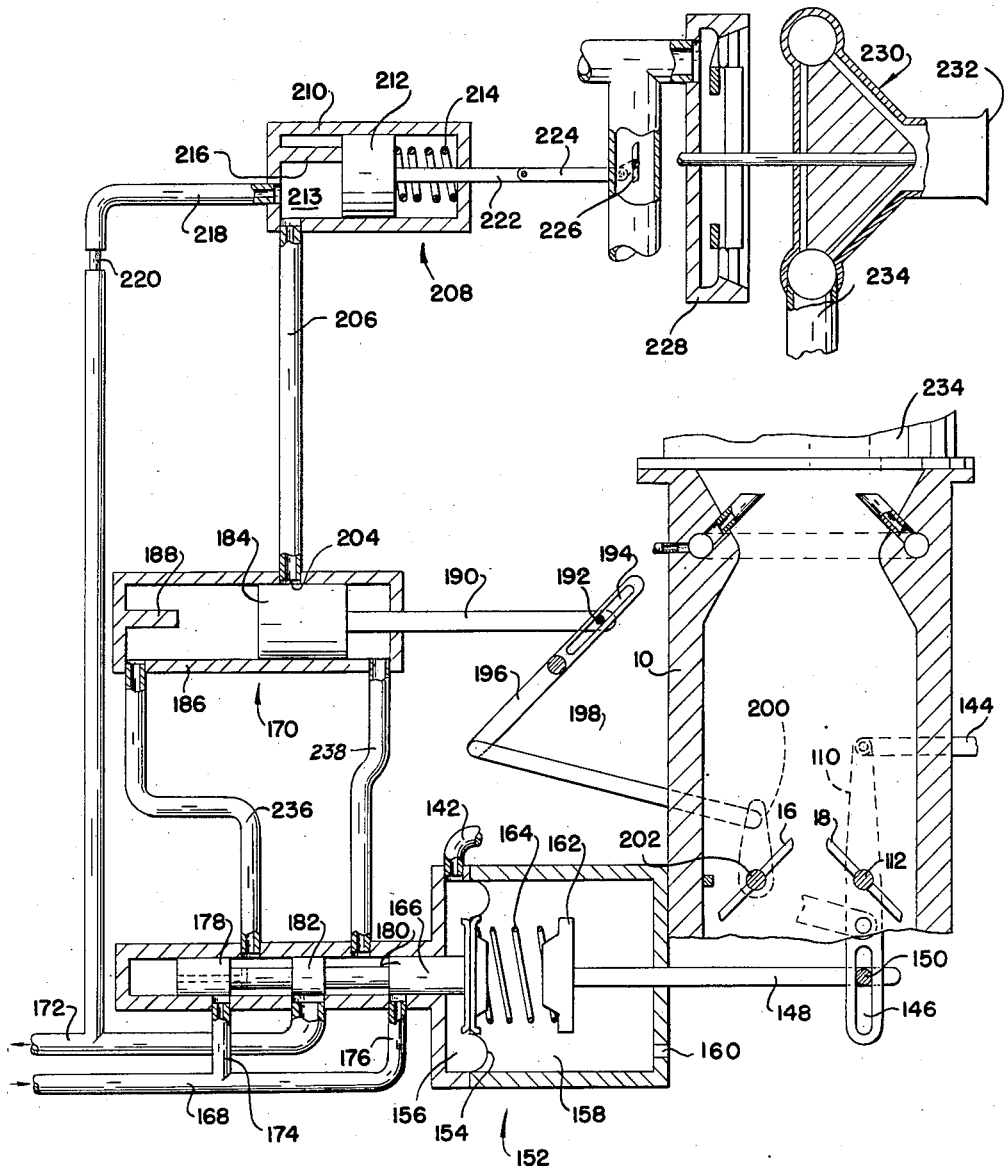

Figure 2 illustrates, somewhat diagrammatically, throttle control apparatus for use with the carburetor of Figure 1 and apparatus for controlling the waste gate of a turbine driven supercharger, and Figure 3 illustrates, somewhat diagrammatically, throttle controlling apparatus for the carburetor of Figure 1, together with apparatus for operating the gear ratio selector of a direct driven supercharger.

Referring to Figure 1, there is shown an air induction conduit 10, thru which air flows from an entrance 12, past a venturi 14, a pair of throttle blades, 16 and 18, and a fuel discharge nozzle 20 to a discharge outlet 22.

Fuel enters the carburetor from a pump thru a conduit 24, and flows thru a fuel regulator 26, a conduit 28, a mixture control 30, a jet system 32, an idle valve mechanism 34, a conduit 36, a pressure regulator 38 and a conduit 40 to the fuel discharge nozzle 20.

The air flowing thru a venturi 14 sets up a differential pressure which varies with the velocity of flow. This differential pressure produces a flow of air thru a secondary air conduit. The entrance to this secondary conduit is formed by a plurality of impact tubes 42, whose open ends project into the entrance 12 so as to receive the impact of the entering air. From these impact tubes 42, the air flows thru a conduit 44, a chamber 46 in a fuel meter 48, a fixed restriction 50, a chamber 52 in the fuel meter 48, a conduit 54, past a valve 56 into a chamber 58 and thence thru a conduit 60 to the throat of venturi 14.

The valve 56 is operated by a flexible bellows 62 mounted in the chamber 48. The bellows 62 operates the valve 56 in accordance with variations in the pressure of the air flowing thru the main induction conduit. This bellows may be filled with a temperature responsive fluid so that the valve 56 also responds to the temperature in the main air conduit. The function of bellows 62 and valve 56 is to correct the air pressure differential appearing across restriction 50 for variations in the air density, so that that air pressure differential is a measure of the mass of air flowing per unit time thru the main conduit 10. The action of this density compensating mechanism is more completely described in the copending application of Milton E. Chandler, Serial No. 490,281, filed June 10, 1943. This air pressure differential, which is a measure of the mass of air flowing per unit time to the engine acts downwardly on a diaphragm 64 which separates the chambers 46 and 52. The diaphragm 64 is attached at its center to the stem 66 of a pilot valve 68.

The fuel regulator 26 includes a pair of expansible chambers 70 and 72 separated by a flexible diaphragm 74. A valve 76 is attached to the center of the diaphragm 74. A spring 78 biases the valve 76 toward open position. The valve 76 acts as an inlet valve for chamber 72, which is connected to the fuel conduit 28. The chambers 70 and 72 are connected thru a fixed restriction 80.

The mixture control 30, includes a disc valve 82 mounted on a manually rotatable shaft 84. When the valve 82 is in the position shown in full lines on the drawing, hereinafter termed its "lean" position, fuel may flow to the jet system 32 only thru a conduit 86. When the disc valve 82 is moved to the dotted line position in the drawing, hereinafter termed its "rich" position, then fuel may flow to the jet system thru a conduit 88 also. The valve 82 may also be moved to a position where it cuts off the flow thru both conduits 86 and 88, which is termed its "cut-off" position.

Fuel entering the jet system 32 from conduit 86 passes either thru a fixed restriction 90 or restriction 92 controlled by a valve 94 which is biased closed by a spring 96. Fuel entering the jet system thru conduit 88 flows thru a fixed restriction 98. Fuel passing thru restrictions 92 and 98 also passes thru another fixed restriction 100. The valve 94 is provided for the purpose of enriching the fuel mixture under conditions of high power output. The restriction 100 is to limit the maximum flow obtainable thru restrictions 92 and 98.

The idle valve mechanism 34 includes a valve 102 operated by a shaft 104, which is connected thru an arm 106 and a link 108 to an arm 110 on the shaft 112 of throttle blade 18. The construction is such that the valve 102 is open whenever the throttle blade 18 is out of the idle range. As the throttle blade 18 nears its closed position, the valve 102 is moved toward its closed position.

The pressure regulator 38 includes a flexible diaphragm 114 separating a pair of expansible chambers 116 and 118. A valve 120 is attached to the center of diaphragm 114 and is biased toward closed position by a spring 122. The chamber 116 receives fuel from the conduit 36. The valve 120 regulates the flow of fuel from chamber 116 into conduit 40. The chamber 118 is vented to atmosphere thru a conduit 124 which connects to conduit 44.

The pressure regulator 38 acts to maintain a substantially constant pressure in the fuel line on the downstream side of the jet system 32. The jet system 32 acts as a metering restriction in the fuel line whose effective area may be varied by the mixture control 30 or by the operation of valve 94. The fuel regulator 26 controls the pressure in the fuel line on the upstream side of the jet system so as to vary that pressure substantially in accordance with the rate of air flow and hence to maintain the fuel flow proportional to the air flow, as hereinafter described.

A portion of the fuel entering chamber 72 of the fuel regulator 26 passes thru restriction 80 and thence thru a conduit 126 to a chamber 128 in the fuel meter 48. Fuel flows from a chamber 128 thru the pilot valve 68 to a drain conduit 130 which is shown as being connected to the main air induction conduit. The drain conduit 130 may alternatively be connected back to the fuel tank or to any other suitable place for the disposal of the fuel passing thru it. The chamber 128 is separated from chamber 52 by a diaphragm 132. The fuel meter 48 also includes a chamber 134 separated from chamber 46 by a diaphragm 136. Chamber 134 is connected thru a conduit 140 to the conduit 36 on the downstream side of the jet system. The three diaphragms 136, 64 and 132 are all connected to the stem 66 of pilot valve 68. A spring 138 biases the valve 68 toward closed position. The pressure in chamber 128, which acts upwardly on the valve 68, differs from the pressure in chamber 72 only by an amount determined by the force of spring 78, which is substantially constant. The pressure in chamber 128 is therefore a measure of the fuel pressure on the upstream side of the jet system. The pressure in chamber 134 is the same as the fuel pressure on the downstream side of the jet system. The difference between these two pressures is a measure of the rate of fuel flow, and this difference acts upwardly on the valve 68 and is balanced by the air differential pressure acting downwardly on diaphragm 64.

When the air pressure differential acting downwardly on valve 68 is balanced by the fuel pressure differential acting upwardly, then the fuel-air ratio is maintained constant at a value determined by the cross-sectional area of the jet system open to the flow of fuel, which determines the rate of fuel flow produced by a given fuel pressure differential across the jet system.

If the air pressure differential increases and thereby exceeds the fuel pressure differential acting upwardly on valve 68, then the valve moves downwardly toward closed position. This causes an increase in pressure in chamber 128. The downward movement of valve 68 continues until the fuel pressure differential acting upwardly balances the air pressure differential. This increased pressure in chamber 128 is transmitted to chamber 70 of fuel regulator 26, where it causes an opening movement of valve 76 to increase the pressure in chamber 72 by a corresponding amount. This increases the fuel pressure differential across the jet system, and thereby increases the fuel flow until it balances the air flow.

From the foregoing, it may be seen that the pressure in chamber 128 is a measure of the rate of flow of air to the engine. This pressure is communicated thru conduit 126 and a conduit 142 to a throttle controlling mechanism shown more completely in Figure 2.

Under low air flow conditions, such as occur when an engine is idling, a Venturi meter such as that shown at 14 does not provide an accurate measure of air flow, inasmuch as its throat area must be designed so that it measures accurately at much higher flows. In other words, the range of air flows encountered is much greater than a single fixed throat Venturi meter can measure accurately. It is therefore desirable to provide means for controlling the fuel flow independently of the pressure differential existing at the venturi under low air flow conditions. It is also desirable to increase the fuel-air ratio under idling conditions to ensure smooth engine operation.

Such idle control means are provided in the carburetor of Figure 1 by the spring 138 in the fuel meter 48, the spring 78 in the fuel regulator 26, and the idle valve 102. The springs 138 and 78 cooperate to establish a minimum value for the fuel pressure differential across the jet system. Even when the pressure differential set up by the air venturi 14 is zero, the valve 68 is biased closed by the spring 138 so as to cause opening of valve 76 until the fuel pressure differential acting upwardly on valve 68 balances the spring 138. At such times, the throttles are near closed position, and the opening thru valve 102, being then smaller than the area of jet 90, is the effective metering restriction. By properly designing springs 138 and 78 and the contour of valve 102, the fuel-air ratio under idle conditions may be controlled as desired.

Figure 2

Referring to Figure 2, it may be seen that the throttle blade 18 is positioned by a manually operated link 144, which is pivotally connected to one end of the arm 110. The other end of arm 110 is provided with a slot 146. A rod 148 carries a pin 150 which rides in the slot 146. The other end of rod 148 extends into a valve operating mechanism 152. The mechanism 152 includes a diaphragm 154 separating a pair of expansible chambers 156 and 158. The conduit 142 (see Figure 1) communicates with chamber 156. The chamber 158 is vented to the atmosphere as indicated at 160. The rod 148 carries, within the chamber 158, a spring retainer 162. A compression spring 164 is held between the retainer 162 and the diaphragm 154. A spool valve 166 is attached to the opposite side of diaphragm 156. The valve 166 selectively controls the direction of flow of fluid from a supply conduit 168 thru a servo-motor 170 to a drain conduit 172. The supply conduit 168 has a pair of branches 174 and 176. When the valve 166 is in the position shown in the drawing, the supply conduits 174 and 176 are blocked by lands 178 and 180, respectively, of the valve 166, and the drain conduit 172 is blocked by a land 182.

The servo-motor 170 includes a piston 184 which is slidable in a cylinder 186. A stop 188 limits the movement of piston 184 to the left. A rod 190 is connected to piston 184 and at its opposite end carries a pin 192 which moves in a slot 194 in a lever 196. The opposite end of lever 196 is connected to a link 198 which is in turn connected to an arm 200 on the shaft 202 of throttle blade 16.

A port 204 in the wall of cylinder 186 is connected thru a conduit 206 to another servo-motor 208. The servo-motor 208 includes a cylinder 210, and a piston 212 slidable therein. A spring 214 biases the piston 212 to the left against a stop 216. The space between the left face of piston 212 and the end of the cylinder 210 is connected thru a conduit 218 having a restriction 220 therein to the drain conduit 172.

The piston 212 is attached to a rod 222 connected thru a link 224 to a waste gate 226. The waste gate 226 is a by-pass valve, which when open permits the exhaust gases from the engine to pass directly to the atmosphere without going thru an exhaust gas turbine 228 which drives a supercharger 230 for supplying air under pressure to the engine. The supercharger intake is shown at 232 and its discharge conduit at 234. The discharge conduit 234 leads directly into the air induction conduit 10.

Operation of Figure 2

The throttle blade 18 is manually controlled by means of link 144. As the blade 18 is moved toward open position, arm 110 moves the rod 148 to the left, increasing the force of spring 164 acting to the left on valve 166. This moves valve 166 to the left, thereby allowing fluid to flow from supply conduit 168 thru conduit 174, past land 178, thru conduit 236 to the left end of cylinder 186. At the same time, the right end of cylinder 186 is connected thru conduit 238 and past valve 166 to the drain conduit 172. The difference in pressure acting on piston 184 moves it to the right, thereby rotating lever 196 clockwise and opening throttle blade 16. This opening movement of throttle blade 16 continues until the air flow is increased sufficiently to increase the pressure in chamber 156 (as described in connection with Figure 1) so as to balance the increased force of spring 164.

Thereafter the system tends to maintain an air flow determined by the setting of spring 164. If the air flow differs from the value which causes the pressure in chamber 156 to balance the force of that spring, then the throttle 16 is operated to vary the air flow to restore that balance. When the throttle 16 reaches its full opened position, the piston 184 uncovers the port 204, and fluid under pressure is then supplied to the chamber 213 in the servo-motor 208. This causes the piston 212 to move to the right thereby closing the waste gate 226 and increasing the flow of exhaust gas thru the turbine 228. This increases the speed of the supercharger 230 and therefore the flow of air to the engine. When the flow of air becomes sufficient so that valve 166 is moved to the right so that the flow of fluid past valve 166 and piston 184 into chamber 213 just balances the discharge of fluid from chamber 213 thru restriction 220, then the waste gate stops moving. If the air flow thereafter changes, then the waste gate position is corrected until the proper air flow is again maintained. If conditions change so that the proper air flow can be maintained without the use of the supercharger, the waste gate will completely open and the system will then control the throttle as above.

As previously explained, the spring 138 in fuel meter 48 (see Figure 1) establishes a minimum value for the fuel pressure differential acting upwardly on valve 68. Since the pressure in chamber 134 is maintained substantially constant by the action of pressure regulator 38, it may be stated that the spring 138 establishes a minimum value for the pressure in chamber 128, which pressure is transmitted thru conduit 142 to chamber 156.

The spring 164 is preferably so designed that when the throttle blade 18 approaches closed position, the spring is not strong enough to overcome the minimum pressure which may exist in chamber 128. Therefore, at such times valve 166 is moved to the right, causing operation of the throttle blade 16 to its completely closed position. Control of the rate of air flow to the engine is therefore accomplished, under idle conditions, exclusively by the use of the manually operable throttle blade 18.

Altho in the illustrated modifications of my invention, I have used the pressure in the chamber 128, communicated thru conduit 142, as a measure of air flow for the purpose of controlling the throttles, it should be realized that other pressures or pressure differentials could be used to oppose spring 164, as long as such pressure or pressure differential is a measure of air flow. For example, either the air pressure differential acting on diaphragm 64 of Figure 1, or the fuel pressure differential across the jet system 32, could be applied directly to the diaphragm 154. Either of those two pressure differentials may be used as a measure of air flow.

*Figure 3*

There is shown in Figure 3 an arrangement wherein the throttle control mechanism is generally the same as that of Figure 2. Additional control mechanism is shown for a gear ratio selector for a direct driven supercharger. The control mechanism for this gear ratio selector is somewhat different from that employed for the waste gate in Figure 2. The parts of the throttle and control mcehanism of Figure 3 have been given the same reference characters as the corresponding parts in Figure 2.

Referring to Figure 3, there is shown a gear ratio selector 250 provided with a lever 252 movable between a low speed position and a high speed position. The end of lever 252 is slotted, as at 254 to receive a pin 256 on the end of a rod 258. The rod 258 is operated by a piston 260, which is biased to the left by a spring 262. A stop 264 limits the leftward movement of piston 260. The piston 260 moves in a cylinder 266. A chamber 268 is formed between the left face of piston 260 and the end of cylinder 266. The chamber 268 is connected thru a conduit 270 to an accumulator bellows 272 located in a housing 274. A stop 276 is provided for limiting the expansion of bellows 272. The chamber 268 is also connected thru a conduit 278 to a conduit 280 leading to a port 282 adjacent the land 178 of valve 166. The conduit 278 also connects with a valve 284 leading to a drain conduit 286. Valve 284 is formed on a rod 285 connected to piston 184. Valve 284 is closed when throttle 16 is wide open or almost wide open, and is opened upon movement of throttle 16 outside of a narrow range of positions adjacent its wide open position.

*Operation of Figure 3*

The system of Figure 3 normally controls the throttle blade 16 to maintain the rate of air flow selected by the adjustment of the force of spring 164. If the throttle 16 reaches its wide open position and the air flow falls below the selected value, then the valve 166 continues to move to the left beyond the position at which it causes an opening movement of the throttle 16. Valve 284 is then closed. If this leftward movement of valve 166 continues, port 282 is opened to the high pressure fluid supply line 174. Fluid then passes thru conduits 280 and 278 to chamber 268. The spring rate of bellows 272 is chosen to be less than that of the spring 262, so that when the high pressure fluid reaches chamber 268 it first expands the bellows 272 against its stop 276, and thereafter causes movement of piston 260 to the right. Therefore the accumulator bellows 272 provides a time delay between the falling off of the air flow below its selected value and the shifting of the supercharger from low to high. The reason for this time delay will become apparent when it is considered that the shift of the supercharger from low speed to high speed provides a sudden increase in air flow, and of a considerable magnitude. If the increase is too great, it may be sufficient to cause the control mechanism to reverse and shift the supercharger back to low speed. A hunting condition might then be established, with the gear ratio selector shifting back and forth from low to high speed. By providing the time delay, it is insured that the demand for increased air flow is sufficient at the time of the shift to high speed so that the supercharger will remain at its high speed after the shift is made.

If, with the supercharger running at high speed the rate of air flow selected is reduced, or if the rate of air flow becomes too great for that selected, then the valve 166 moves to the right, causing movement of the throttle 16 toward closed position. As this movement continues, a point is eventually reached where the valve 284 is opened. The chamber 268 is then drained thru conduit 278, valve 284 and conduit 286, the force to discharge fluid from chamber 268 being supplied by spring 262 and the tension of bellows 272. The supercharger gear ratio is then restored to its low speed condition. The throttle 16 is then positioned to restore the desired air flow under low supercharger speed conditions.

From the foregoing, it may be seen that in my improved throttle control system, a movement of the manually operable lever results in immediate movement of the throttle blade 18, regardless of any lag which may occur in the operation of the throttle blade 16. Furthermore, if the automatic mechanism controlling the throttle blade 16 fails for any reason, the operator still has partial control of the rate of air flow to the engine by means of the throttle blade 18.

Because of the rapid response of the manually operated throttle blade 18, it is possible to construct the control system for the automatically operated blade 16 so that its movements are highly damped. By such damping, hunting of the automatic control system may be prevented without loss of sensitivity or rapidity of response of the complete system including both manual and automatic blades.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Control apparatus for an internal combustion engine, comprising a conduit for air flowing to said engine, a pair of throttle blades for controlling the flow of air thru said conduit, means for manually moving one of said throttle blades, motor means for simultaneously moving the other of said throttle blades, and means connected for concurrent movement with said one throttle blade for controlling said motor means to coordinate the simultaneous movements of said other throttle blade.

2. Control apparatus for an internal combustion engine, comprising a conduit for air flowing to said engine, a pair of throttle blades for controlling the flow of air thru said conduit, means for manually moving one of said throttle blades, motor means for moving the other of said throttle blades, a device for controlling said motor means, said device having a neutral position in which said motor means is stationary and being effective upon movement from said neutral position in either direction to cause operation of said motor means in a corresponding direction, means responsive to the rate of air flow thru said conduit for moving said device in an air flow decreasing direction, spring means opposing said air flow responsive means, and means associated with said one throttle blade for increasing the opposing force of said spring means as said one blade is moved toward open position.

9

3. Control apparatus for an internal combustion engine, comprising a conduit for air flowing to said engine, a pair of throttle blades for controlling the flow of air thru said conduit, means for manually moving one of said throttle blades, motor means for moving the other of said throttle blades, means responsive to the rate of air flow thru said conduit for controlling said motor means to maintain a substantially constant air flow, means for varying the setting of said air flow responsive means, and means associated with said one throttle blade for operating said setting varying means in a flow increasing sense as said one blade is moved toward open position.

4. Control apparatus for an internal combustion engine, comprising a conduit for air flowing to said engine, a pair of throttle blades for controlling the flow of air thru said conduit, means for manually moving one of said throttle blades, motor means for moving the other of said throttle blades, a device for controlling said motor means, said device having a neutral position in which said motor means is stationary and being effective upon movement from said neutral position in either direction to cause operation of said motor means in a corresponding direction, means normally responsive to the rate of air flow thru said conduit for applying a force to said device in an air flow decreasing direction, means for establishing a minimum value for said force regardless of said air flow, spring means opposing said air flow responsive means, and means associated with said one throttle blade for increasing the opposing force of said spring means as said one blade is moved toward open position, and for decreasing the opposing force of said spring means as said one blade is moved toward closed position, said device, said last-named means and said minimum establishing means cooperating to cause movement of said other throttle blade to closed position whenever the force of said spring means becomes less than that established by said minimum establishing means.

5. Control apparatus for an internal combustion engine having a throttle for controlling the flow of combustion air to said engine, a supercharger for supplying air under pressure to said engine, an exhaust gas turbine for driving said supercharger, and a waste gate for regulating the operation of said supercharger; said control apparatus comprising a first hydraulic servo-motor for operating said throttle, including a cylinder and a piston reciprocable therein, means for selectively supplying fluid at high pressure to either end of said cylinder and connecting the opposite end of said cylinder to a source of lower pressure to cause translation of said piston selectively in opposite directions, a second hydraulic servomotor for operating said waste gate including an expansible chamber having a movable wall connected to said waste gate, spring means biasing said wall to a position wherein said waste gate is open, and means for supplying fluid under pressure to said chamber to move said waste gate toward closed position including a port in the wall of said cylinder, said port being normally closed by said piston but opening into the high pressure end of said cylinder when said throttle reaches its wide open position.

6. Control apparatus for an internal combustion engine having a conduit for combustion air flowing to said engine, a pair of throttle blades for controlling the flow of air thru said conduit, a supercharger for supplying air under pressure to said engine, an exhaust gas turbine for driving said supercharger, and a waste gate for regulating the operation of said supercharger; said control apparatus comprising means for manually moving one of said throttle blades, a first hydraulic servo-motor for operating the other blade including a cylinder and a piston reciprocable therein, means for selectively supplying fluid at high pressure to either end of said cylinder and connecting the opposite end of said cylinder to a source of lower pressure to cause translation of said piston selectively in opposite directions, means responsive to the position of said one blade for operating said selective supply means, a second hydraulic servo-motor for operating said waste gate including an expansible chamber having a movable wall connected to said waste gate, spring means biasing said wall to a position wherein said waste gate is open, and means for supplying fluid under pressure to said chamber to move said waste gate toward closed position including a port in the wall of said cylinder, said port being normally closed by said piston but opening into the high pressure end of said cylinder when said other blade reaches its wide open position.

7. Control apparatus for an internal combustion engine having a throttle for controlling the flow of combustion air to said engine, a supercharger for supplying air under pressure to said engine, a driving connection between said engine and said supercharger, variable gear ratio transmission means in said connection, and means for shifting said transmission from low to high gear ratio; said control apparatus comprising a hydraulic servo-motor for operating said throttle, a valve for controlling said servo-motor, said valve having a neutral position in which said servo-motor is stationary and being effective upon movement from said neutral position in one direction to cause operation of said throttle in an opening direction and upon movement in the opposite direction to cause operation of said throttle in a closing direction, a hydraulic servo-motor for operating said shifting means including an expansible chamber having a movable wall connected to said shifting means, spring means biasing said shifting means to its low supercharger speed position, and means for supplying fluid under pressure to said chamber to move said shifting means to its high supercharger speed position including a port adjacent said valve and normally closed thereby, but opened thereby upon movement of said valve in said one direction beyond its normal range of movement.

8. Control apparatus for an internal combustion engine having a throttle for controlling the flow of combustion air to said engine, a supercharger for supplying air under pressure to said engine, a driving connection between said engine and said supercharger, variable gear ratio transmission means in said connection, and means for shifting said transmission from low to high gear ratio; said control apparatus comprising a hydraulic servo-motor for operating said throttle, a valve for controlling said servo-motor, said valve having a neutral position in which said servo-motor is stationary and being effective upon movement from said neutral position in one direction to cause operation of said throttle in an opening direction and upon movement in the opposite direction to cause operation of said throttle in a closing direction, a hydraulic servo-motor for operating said shifting means including an expansible chamber having a movable wall connected to said shifting means, spring means biasing said shifting means to its low supercharger speed position, means for supplying fluid under pressure to said chamber to move said shifting means to its high supercharger speed position including a port adjacent said valve and normally closed thereby, but opened thereby upon movement of said valve in said one direction beyond its normal range of movement, and time delay means for slowing the operation of said shifting means to its high supercharger speed position including a second expansible chamber connected to said first mentioned chamber, and resilient means associated with said second chamber to resist its expansion, said resilient means having a spring rate lower than that of said spring means so that said second chamber fills before said wall starts to move.

9. Control apparatus for an internal combustion engine, comprising a conduit for air flowing to said engine, a pair of throttle blades for controlling the flow of air thru said conduit, means for manually moving one of said throttle blades, motor means for moving the other of said throttle blades, a device for controlling said motor means, said device having a neutral position in which said motor means is stationary and being effective upon movement from said neutral position in either direction to cause operation of said motor means in a corresponding direction, an expansible chamber having a movable wall connected to said device so as to move said device in a throttle closing direction upon expansion of said chamber, means for controlling the pressure in said chamber including a restricted inlet passage, a restricted outlet passage, and pilot valve means responsive to the rate of combustion air flow to said engine for controlling said outlet passage so as to maintain the pressure in said chamber substantially proportional to the rate of air flow over most of the range of variation of said air flow, first spring means biasing said pilot valve means toward closed position and effective to establish a minimum pressure in said chamber, second spring means acting on said movable wall in opposition to the pressure in said chamber, and means associated with said one throttle blade for increasing the opposing force of said second spring means as said one blade is moved toward open position and for decreasing the opposing force of said second spring means as said one blade is moved toward closed position, said last-named means and said first and second spring means cooperating to cause movement of said other blade to closed position whenever the force of said second spring means becomes less than that due to the minimum pressure in said chamber.

10. Control apparatus for an internal combustion engine, comprising a conduit for air flowing to said engine, a pair of throttle blades for controlling the flow of air thru said conduit, means for manually moving one of said throttle blades, motor means for moving the other of said throttle blades, a device for controlling said motor means, said device having a neutral position in which said motor means does not operate in either direction and being effective upon movement from said neutral position in either direction to cause operation of said motor means in a corresponding direction, means responsive to the rate of air flow thru said conduit for moving said device in an air flow decreasing direction, spring means opposing said air flow responsive means, means associated with said one throttle blade for increasing the opposing force of said spring means as said one blade is moved toward open position and for decreasing the opposing force of said spring means as said one blade is moved toward closed position, and means for positively closing said other blade under engine idling conditions so that the air flow is then controlled by said one blade only.

11. Control apparatus for an internal combustion engine having a conduit for combustion air flowing to said engine, a supercharger for supplying air under pressure to said engine, and means for varying the speed of said supercharger; said control apparatus comprising a pair of throttle blades for controlling the flow of air thru said conduit, means for manually moving one of said throttle blades, motor means for moving the other of said throttle blades, a device for controlling said motor means, said device having a neutral position in which said motor means is stationary and being effective upon movement from said neutral position in either direction to cause operation of said motor means in a corresponding direction, means responsive to the rate of air flow thru said conduit for moving said device in an air flow decreasing direction, spring means opposing said air flow responsive means, means associated with said one throttle blade for increasing the opposing force of said spring means as said one blade is moved toward open position and for decreasing the opposing force of said spring means as said one blade is moved toward closed position, and means for operating said speed varying means in a supercharger speed increasing sense upon failure of said air flow responsive means to balance the force of said spring means.

12. Control apparatus for an internal combustion engine having a throttle for controlling the flow of combustion air to said engine, a supercharger for supplying air under pressure to said engine, a driving connection between said engine and said supercharger, variable gear ratio transmission means in said connection, and means for shifting said transmission from low to high gear ratio; said control apparatus comprising a hydraulic servomotor for operating said throttle, a valve for controlling said servo-motor, said valve having a neutral position in which said servo-motor is stationary and being effective upon movement from said neutral position in one direction to cause operation of said throttle in an opening direction and upon movement in the opposite direction to cause operation of said throttle in a closing direction, a hydraulic servomotor for operating said shifting means including an expansible chamber having a movable wall connected to said shifting means, spring means biasing said shifting means to its low supercharger speed position, means for supplying fluid under pressure to said chamber to move said shifting means to its high supercharger speed position including a port adjacent said valve and normally closed thereby, but opened thereby upon movement of said valve in said one direction beyond its normal range of movement, and means for draining fluid from said chamber to cause said spring means to operate said shifting means to its low supercharger speed position including a second valve movable concurrently with said throttle and closed only when said throttle is in a range of positions adjacent its wide open position.

13. Control apparatus for an internal combustion engine having a throttle for controlling the flow of combustion air to said engine, a supercharger for supplying air under pressure to said engine, a driving connection between said engine and said supercharger, variable gear ratio transmission means in said connection, and means for shifting said transmission from low to high gear ratio; said control apparatus comprising a hydraulic servo-motor for operating said throttle, a valve for controlling said servo-motor, said valve having a neutral position in which said servo-motor is stationary and being effective upon movement from said neutral position in one direction to cause operation of said throttle in an opening direction and upon movement in the opposite direction to cause operation of said throttle in a closing direction, a hydraulic servo-motor for operating said shifting means including an expansible chamber having a movable wall connected to said shifting means, spring means biasing said shifting means to its low supercharger speed position, means for supplying fluid under pressure to said chamber to move said shifting means to its high supercharger speed position, and means for draining fluid from said chamber to cause said spring means to operate said shifting means to its low supercharger speed position including a second valve movable concurrently with said throttle and closed only when said throttle is in a range of positions adjacent its wide open position.

14. Control apparatus for an internal combustion engine having a throttle for controlling the flow of combustion air to said engine, a supercharger for supplying air under pressure to said engine, a driving connection between said engine and said supercharger, variable gear ratio transmission means in said connection, and means for shifting said transmission from low to high gear ratio; said control apparatus comprising a hydraulic servo-motor for operating said throttle, a valve for controlling said servo-motor, said valve having a neutral position in which said servo-motor is stationary and being effective upon movement from said neutral position in one direction to cause operation of said throttle in an opening direction and upon movement in the opposite direction to cause operation of said throttle in a closing direction, a hydraulic servo-motor for operating said shifting means including an expansible chamber having a movable wall connected to said shifting means, spring means biasing said shifting means to its low supercharger speed position, means for supplying fluid under pressure to said chamber to move said shifting means to its high supercharger speed position including a port adjacent said valve and normally closed thereby, but opened thereby upon movement of said valve in said one direction beyond its normal range of movement, and means for draining fluid from said chamber to cause said spring means to operate said shifting means to its low supercharger speed position.

15. Fluid flow control apparatus, comprising a conduit for said fluid, throttle valve means including a pair of adjacent valve members for controlling the flow of fluid thru said conduit, means for manually moving one of said members, motor means for moving the other of said members, and means connected for concurrent movement with said one member for controlling said motor means to coordinate the movements of said other member.

16. Fluid flow control apparatus comprising a conduit for said fluid, a pair of throttle members for controlling the flow of fluid thru said conduit, means for manually moving one of said throttle members, motor means for moving the other of said throttle members, a device for controlling said motor means, said device having a neutral position in which said motor means is stationary and being effective upon movement from said neutral position in either direction to cause operation of said motor means in a corresponding direction, means responsive to the rate of fluid flow thru said conduit for moving said device in a flow decreasing direction, spring means opposing said flow responsive means, and means associated with said one throttle member for increasing the opposing force of said spring means as said one member is moved toward open position.

17. Fluid flow control apparatus comprising a conduit for said fluid, a pair of throttle members for controlling the flow of fluid thru said conduit, means for manually moving one of said throttle members, motor means for moving the other of said throttle members, means responsive to the rate of fluid flow thru said conduit for controlling said motor means to maintain a substantially constant rate of flow, means for varying the setting of said flow responsive means, and means associated with said one throttle member for operating said setting varying means in a flow increasing sense as said one member is moved toward open position.

LEIGHTON LEE, II.

REFERENCES CITED

The following references are of record in the file of this patent:

UNITED STATES PATENTS

| Number | Name | Date |
| --- | --- | --- |
| 941,426 | Loudon | Nov. 30, 1909 |
| 2,297,235 | Müller | Sept. 29, 1942 |
| 2,305,810 | Müller | Dec. 22, 1942 |
| 2,404,262 | Whitfield | July 16, 1946 |
| 2,423,417 | Stokes et al. | July 1, 1947 |